United States Patent
Hyakuda et al.

(10) Patent No.: US 10,384,515 B2
(45) Date of Patent: Aug. 20, 2019

(54) VEHICLE AIR CONDITIONER

(71) Applicant: JAPAN CLIMATE SYSTEMS CORPORATION, Hiroshima (JP)

(72) Inventors: Kazutoshi Hyakuda, Hiroshima (JP); Yosuke Harada, Hiroshima (JP); Kazuhiro Yamamoto, Hiroshima (JP); Koji Aso, Hiroshima (JP)

(73) Assignee: JAPAN CLIMATE SYSTEMS CORPORATION, Hiroshima (JP)

( * ) Notice: Subject to any disclaimer, the term of this patent is extended or adjusted under 35 U.S.C. 154(b) by 919 days.

(21) Appl. No.: 14/380,247

(22) PCT Filed: Feb. 6, 2013

(86) PCT No.: PCT/JP2013/000646
§ 371 (c)(1),
(2) Date: Aug. 21, 2014

(87) PCT Pub. No.: WO2013/128804
PCT Pub. Date: Sep. 6, 2013

(65) Prior Publication Data
US 2015/0033781 A1      Feb. 5, 2015

(30) Foreign Application Priority Data
Mar. 1, 2012   (JP) .................... 2012-045386

(51) Int. Cl.
*B60H 1/32*          (2006.01)
*B60H 1/00*          (2006.01)

(52) U.S. Cl.
CPC ........... *B60H 1/32* (2013.01); *B60H 1/00028* (2013.01); *B60H 1/00535* (2013.01);
(Continued)

(58) Field of Classification Search
None
See application file for complete search history.

(56) References Cited

U.S. PATENT DOCUMENTS

| | | | |
|---|---|---|---|
| 5,555,739 A * | 9/1996 | Kujirai | B60H 1/00571 62/225 |
| 2006/0230774 A1* | 10/2006 | Shibata | B60H 1/00521 62/239 |
| 2011/0127730 A1* | 6/2011 | Seryi | B60H 1/00571 277/606 |

FOREIGN PATENT DOCUMENTS

| | | | |
|---|---|---|---|
| JP | H08-091044 A | 4/1996 | |
| JP | H10-278563 A | 10/1998 | |

(Continued)

OTHER PUBLICATIONS

International Search Report; PCT/JP2013/000646; dated May 14, 2013.

*Primary Examiner* — Elizabeth J Martin
(74) *Attorney, Agent, or Firm* — Studebaker & Brackett PC (57) ABSTRACT

A vehicle air conditioner to be installed in a passenger compartment S includes a casing, a piping component, and a seal 60. The casing accommodates a heat exchanger. The piping component supplies a heating medium to the heat exchanger or exhausts the heating medium from the heat exchanger. The seal 60 seals a portion between the casing and a periphery of an opening P of a dash panel P of a vehicle. The dash panel P separates the passenger compartment S from an outside of the passenger compartment S. The piping component is inserted into the opening. The seal 60 has a surface facing the dash panel P and including a notch 60*d*. The notch 60*d* is positioned outside the periphery of opening P1.

4 Claims, 7 Drawing Sheets

(52) U.S. Cl.
CPC ............... *B60H 1/00571* (2013.01); *B60H 2001/00214* (2013.01); *B60H 2001/00635* (2013.01); *B60H 2001/3286* (2013.01)

(56) References Cited

FOREIGN PATENT DOCUMENTS

| | | | |
|---|---|---|---|
| JP | 2007-331532 | A | 12/2007 |
| JP | 2009-291876 | A | 12/2009 |

\* cited by examiner

VEHICLE AIR CONDITIONER

TECHNICAL FIELD

The present invention relates to vehicle air conditioners for, e.g., automobiles etc.

BACKGROUND ART

A typical vehicle air conditioner is accommodated inside an instrument panel provided on a front end of a passenger compartment. The vehicle air conditioner includes a heat exchanger for cooling and a heat exchanger for heating. The heat exchanger is connected with a pipe for supplying or exhausting a heating medium. This pipe protrudes toward an engine room through an opening of a partition that separates the engine room from the passenger compartment of the vehicle. This pipe is connected with a pipe extending from an apparatus on the engine room side in order to supply a heating medium to the heat exchanger or exhaust the heating medium from the heat exchanger.

The above vehicle air conditioner employs a seal that avoids intrusion of water from the opening of the partition. See, e.g., Patent Documents 1 and 2.

Patent Documents 1 and 2 disclose a seal that is an elastic member. The seal is disposed between the partition and a casing of the vehicle air conditioner of the vehicle. This seal is larger than the opening. The pipe penetrates the seal. The seal has a surface that faces an engine room. This surface has a notch that surrounds a pipe inside a periphery of the opening of the partition. This notch avoids a gap between the seal and the pipe.

CITATION LIST

Patent Document

PATENT DOCUMENT 1: Japanese Unexamined Patent Publication No. H10-278563
PATENT DOCUMENT 2: Japanese Unexamined Patent Publication No. 2007-331532

SUMMARY OF THE INVENTION

Technical Problem

Figure 10:
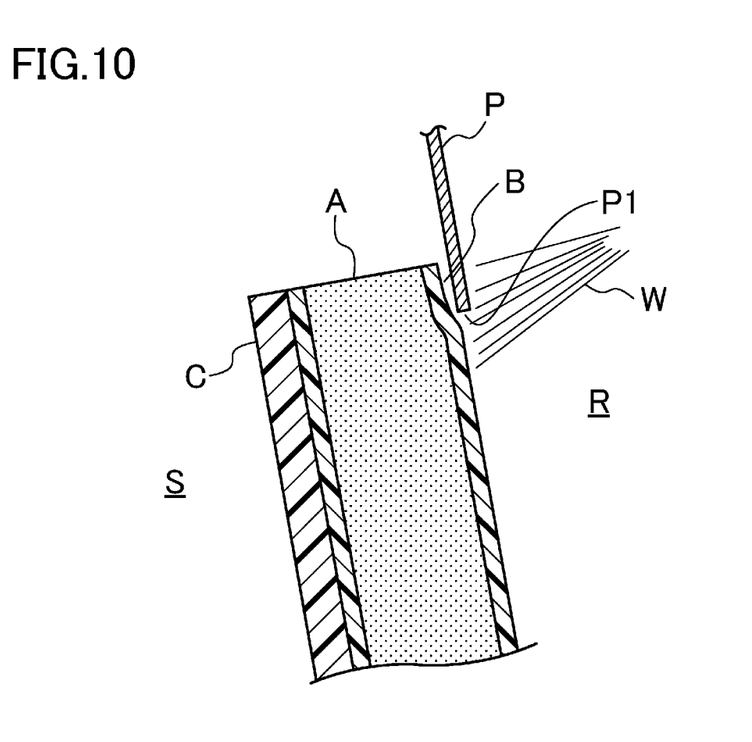
FIG. 10 is a cross-sectional view showing that high pressure water is provided to a typical seal.

However, when a high pressure car washer washes a vehicle as illustrated in, e.g., FIG. 10, high pressure water W is sometimes provided from the engine room R side to a seal A provided on a casing C. The high pressure water W presses and deforms the seal A. If the seal A is deformed near a periphery of an opening P1 of a partition P, the water might intrude into a passenger compartment S from a gap B between the periphery of the opening P1 and the seal A.

To avoid this problem, a larger seal A may be employed. A higher pressure may also be applied from the seal A to the partition P. However, the larger seal A increases the cost. The higher pressure also increases a load caused by a bounce against, in particular, the casing C side. Thus, a reinforcement structure is required, and the cost is increased.

It is an object of the present invention to provide a high sealing performance without increasing the size of the seal and the pressure on the partition.

Solution to the Problem

To achieve the object, the seal of the present invention includes a notch that is positioned outside an opening of a partition.

According to a first aspect of the invention, a vehicle air conditioner to be installed in a passenger compartment includes a casing, a piping component, and a seal. The casing accommodates a heat exchanger. The piping component supplies a heating medium to the heat exchanger, or exhausts the heating medium from the heat exchanger. The seal seals a portion between the casing and a periphery of an opening of a partition of a vehicle. The partition separates a passenger compartment from an outside of the passenger compartment. The piping component is inserted into the opening. The seal has a surface facing the partition and including a notch. The notch is positioned outside the periphery of the opening.

In this configuration, a portion of the seal outside the notch is pressed on a portion of the partition outside the opening. A portion of the seal inside the notch is also pressed on the portion of the partition outside the opening. That is, this configuration provides at least a double seal structure.

When high pressure water is provided to the seal from an outside of the vehicle, the portion of the seal inside the notch might be deformed and removed from the periphery of the opening. However, according to the first aspect of the invention, the notch of the seal stops the deformation of the seal by the high water pressure at the notch to avoid the deformation of the portion of the seal outside the notch. This configuration keeps the portion of the seal outside the notch pressed on the portion of the partition outside the opening, and provides a high sealing performance.

According to a second aspect of the invention, the notch of the first aspect of the invention is discontinuous along the periphery of the opening.

In this configuration, in production of the seal, the notch can be stamped out with, e.g., a mold. In this case, the portion of the seal outside the notch and the portion of the seal inside the notch are integrated together and serve as a single component.

According to a third aspect of the invention, the notch of the first aspect of the invention is continuous along the periphery of the opening.

In this configuration, the portion of the seal outside the notch is separated from the portion of the seal inside the notch. Thus, the deformation of the portion of the seal inside the notch by the high pressure water does not affect the portion of the seal outside the notch. This configuration provides a higher sealing performance.

Advantages of the Invention

According to the first aspect of the invention, the seal includes the notch that is positioned outside the periphery of the opening of the partition. This configuration provides a high sealing performance without increasing the size of the seal and pressure on the partition.

According to the second aspect of the invention, the notch is discontinuous. This configuration eases the production of the seal by the stamping method, and improves the workability during the installation of the seal serving as a single component.

According to the third aspect of the invention, the notch is continuous. The deformation of the portion of the seal inside the notch by the high pressure water does not affect the portion of the seal outside the notch. This configuration provides a higher sealing performance.

DESCRIPTION OF EMBODIMENTS

An embodiment of the present invention will be described in detail below with reference to the drawings. The following description of the preferable embodiment is essentially only an example, and is not intended to restrict the present invention, its application, or its usage.

Figure 1:
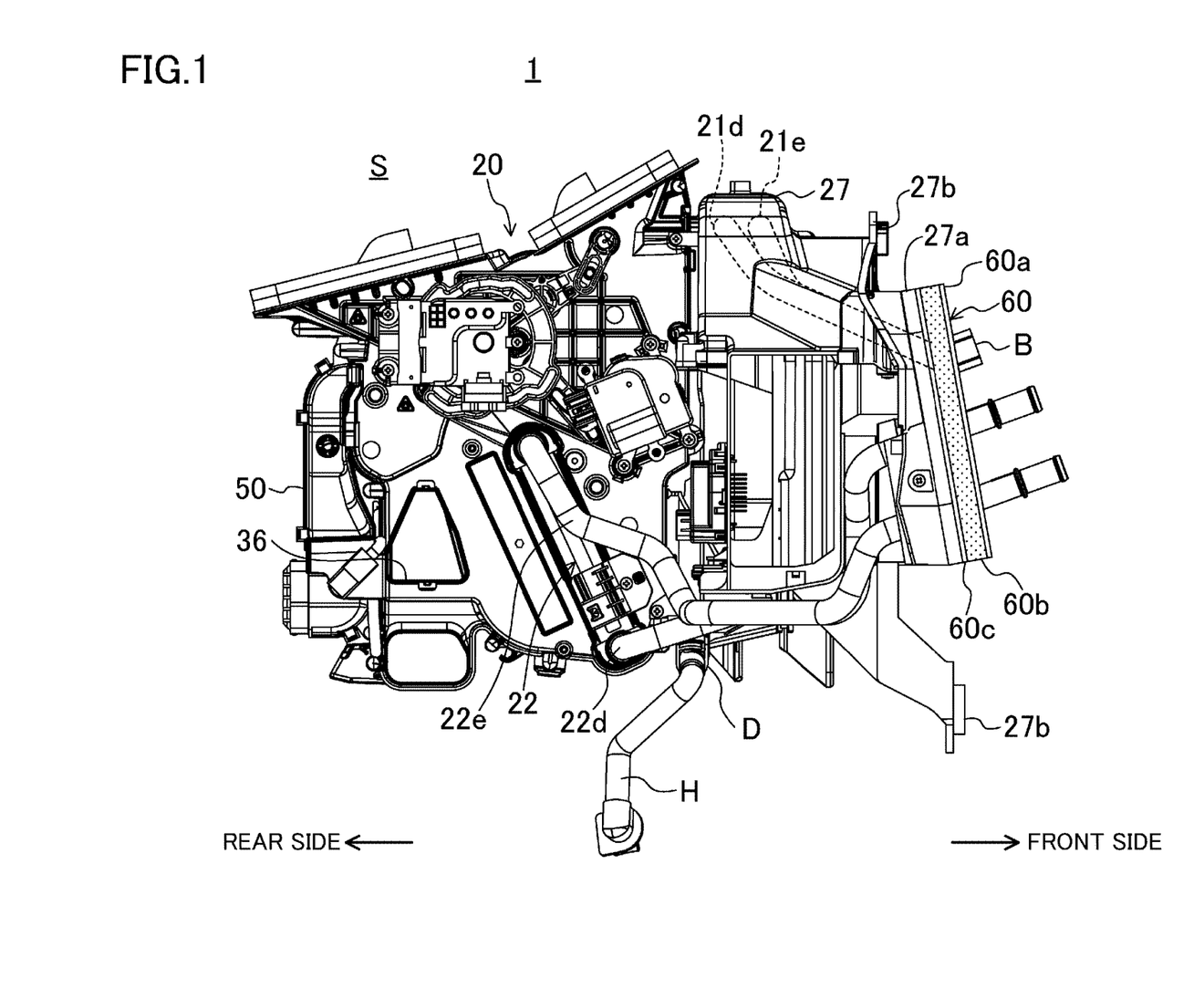
FIG. 1 is a side view of a vehicle air conditioner.
Figure 2:
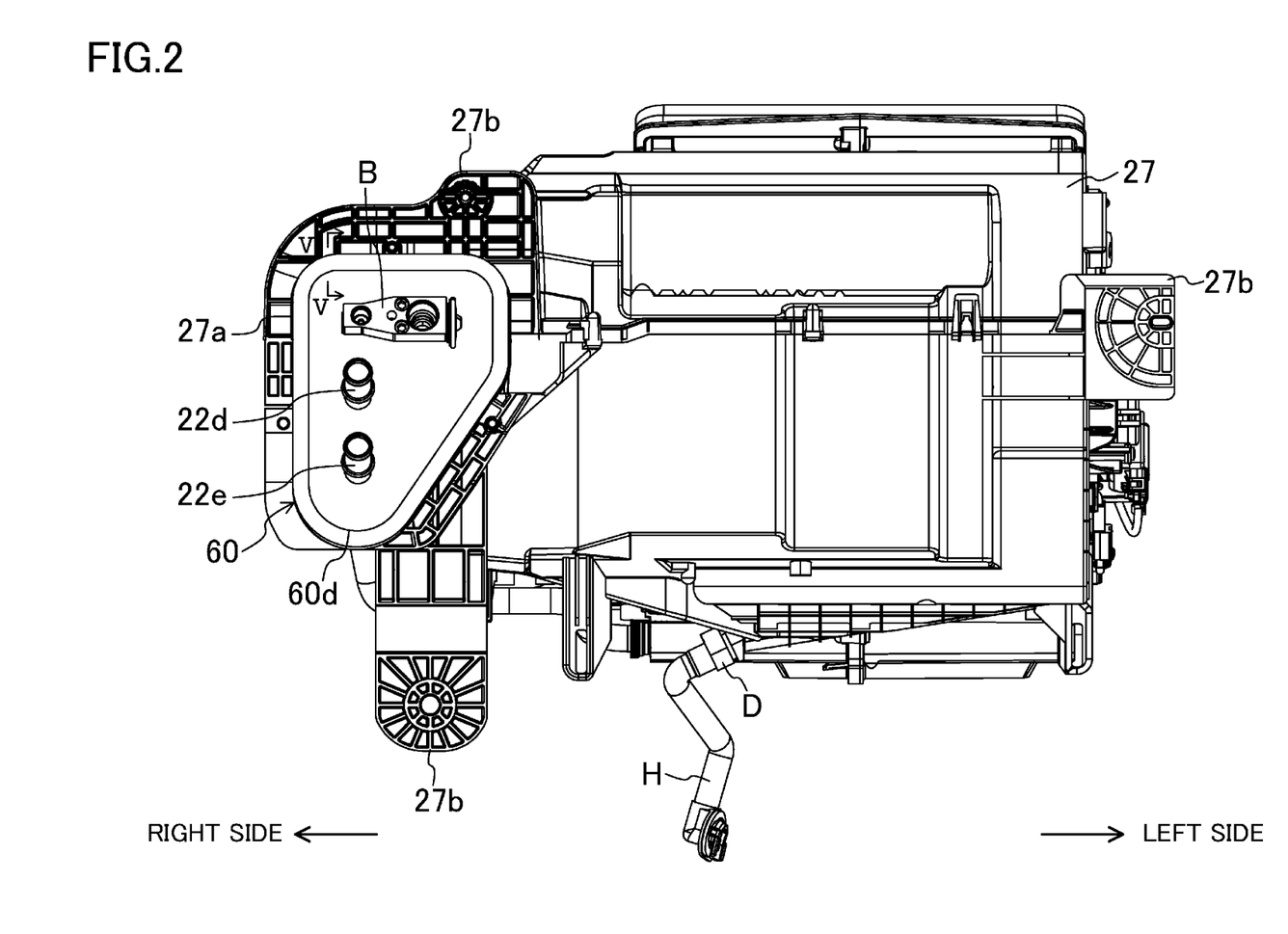
FIG. 2 is a front view of the vehicle air conditioner.

FIGS. 1 and 2 illustrate a vehicle air conditioner 1 of the embodiment of the present invention. FIG. 1 is a right side view of the vehicle air conditioner 1. FIG. 2 is a front view of the vehicle air conditioner 1.

The vehicle air conditioner 1 is installed in a vehicle, which is a so-called automobile. This vehicle includes a passenger compartment S (also illustrated in FIG. 5) including a front seat and a rear seat. The front seat includes a driver seat and a passenger seat. This vehicle is also a left hand drive vehicle that includes a steering wheel (a driver seat) on the left side.

Figure 5:
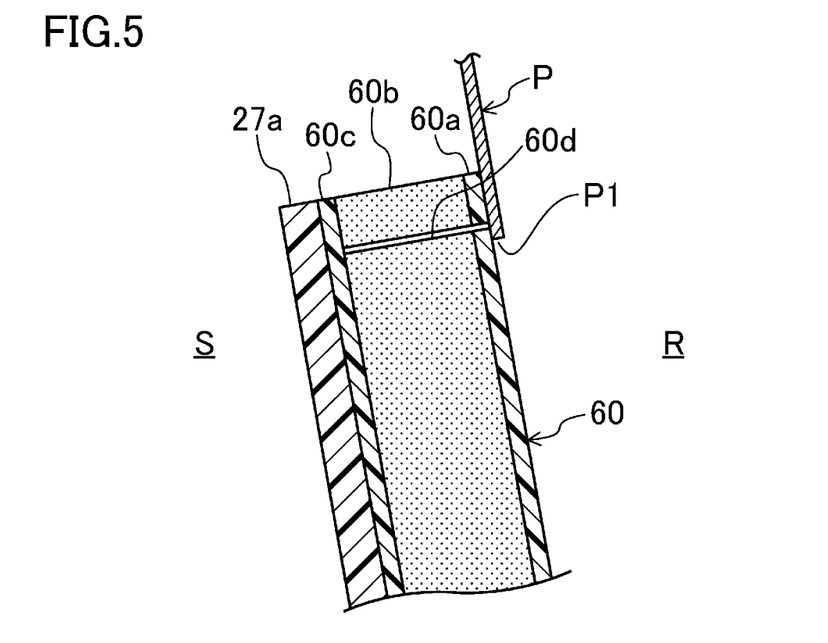
FIG. 5 is a cross-sectional view taken along line V-V of FIG. 2.

FIG. 5 illustrates that a dash panel P (a partition) of the vehicle separates the passenger compartment S from the engine room R. This dash panel P is generally vertical. The dash panel P has a vertically middle portion on which an opening P1 is disposed. The opening P1 allows a cooler pipe and a heater pipe on the passenger compartment S side to extend toward the engine room R side. This opening P1 allows the cooler pipe and the heater pipe on the passenger compartment S side to be connected with a cooler pipe and a heater pipe on the engine room R side.

In the description of this embodiment, the front side of the vehicle is described only by "front," the rear side by "rear," the right side by "right," and the left side by "left."

The vehicle air conditioner 1 includes a blow unit (not shown) and an air conditioning unit 20. Both units 20 are accommodated inside an instrument panel (not shown) provided on a front end of the passenger compartment.

Inside the instrument panel, the blow unit is disposed on a passenger seat side (the right side) of the vehicle. The air conditioning unit 20 is disposed in a widthwise (laterally) center portion. The blow unit is connected with the air conditioning unit 20. The blow unit blows conditioned air, which is introduced into the air conditioning unit 20. The blow unit and the air conditioning unit 20 are also fixed to the dash panel P and an instrument panel reinforcement (both not shown) of the vehicle. FIGS. 1 and 2 illustrate an engage portion 27b that engages with the dash panel P etc.

The blow unit includes a blower including a sirocco fan. The blow unit also includes a switch for switching between inside air and outside air. This switch for switching between inside air and outside air selects either the air inside the passenger compartment or the air outside the passenger compartment to introduce it.

Figure 3:
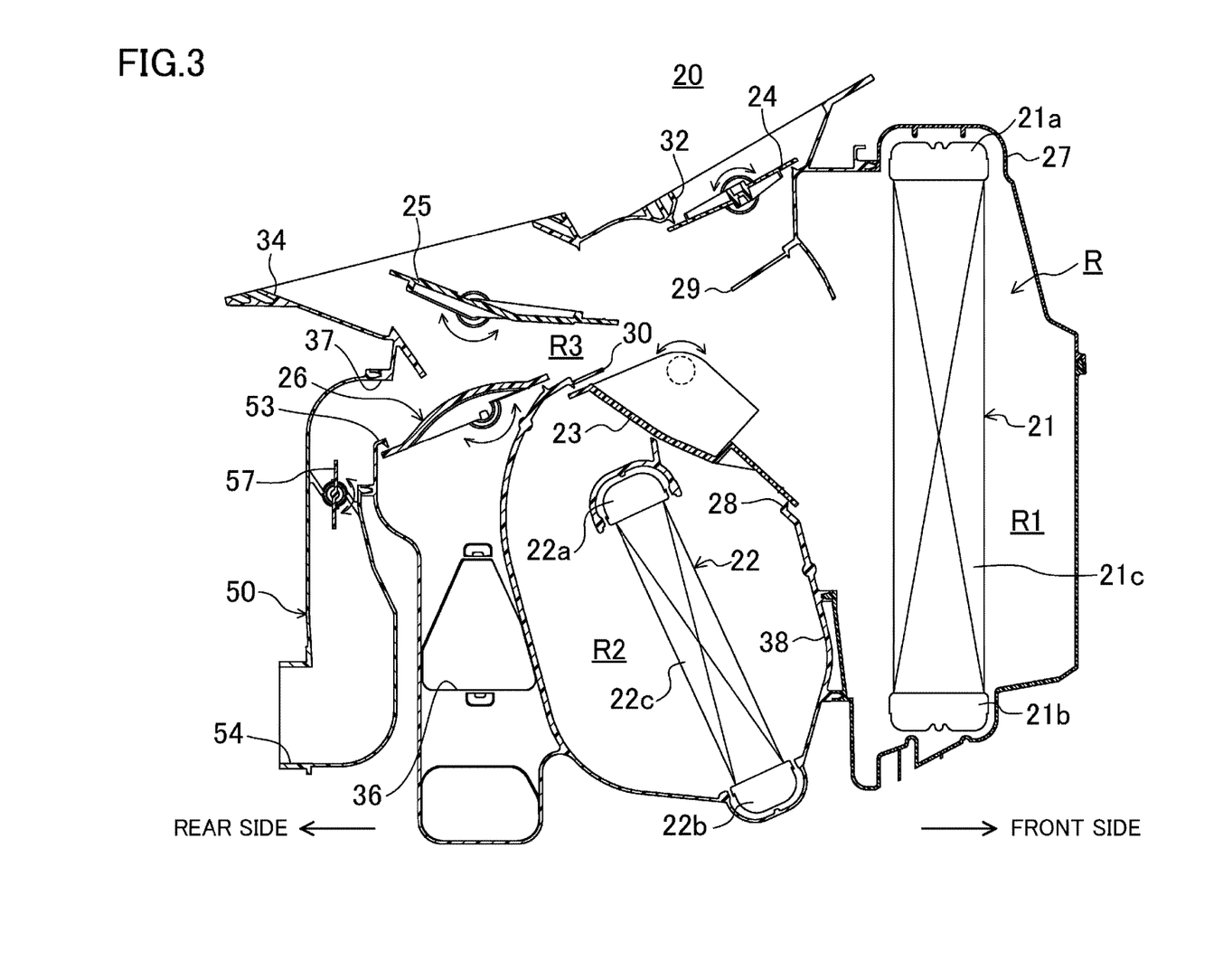
FIG. 3 is a cross-sectional view of the vehicle air conditioner.

FIG. 3 illustrates an internal structure of the air conditioning unit 20. The air conditioning unit 20 includes a resin casing 27 that accommodates an evaporator 21, a heater core 22, an air mix damper 23, a defroster damper 24, a vent damper 25, and a heat damper 26. The evaporator 21 serves as a heat exchanger for cooling. The heater core 22 serves as a heat exchanger for heating.

The casing 27 includes an air passage R in which the conditioned air flows. The evaporator 21 is disposed in a cooling passage R1 partially serving as the air passage R. The conditioned air flows in the cooling passage R1. The conditioned air also passes through and is cooled by the evaporator 21.

The evaporator 21 includes an upper side header tank 21a, a lower side header tank 21b, and a core 21c. The core 21c includes a plurality of tubes and fins that extend vertically. The tubes each has an upper end that communicates with the upper side header tank 21a. The tubes each has a lower end that communicates with the lower side header tank 21b.

As illustrated in FIG. 1 by dashed lines, the upper side header tank 21a is connected with a supply side cooler pipe 21d and a discharge side cooler pipe 21e. The supply side cooler pipe 21d supplies a refrigerant serving as a heating medium to the upper side header tank 21a. The discharge side cooler pipe 21e discharges the refrigerant in the upper side header tank 21a to the outside. The supply side cooler pipe 21d and the discharge side cooler pipe 21e extend in the casing 27 toward the front side. They also penetrate a front wall portion of the casing 27 and protrude forward. The supply side cooler pipe 21d and the discharge side cooler pipe 21e have end portions (front ends) that align laterally. An expansion valve block B including an expansion valve is installed on the end portions of the supply side cooler pipe 21d and the discharge side cooler pipe 21e.

The expansion valve block B is connected with the cooler pipe on the engine room R side. The cooler pipe on the engine room R side extends from components such as a compressor and a condenser (provided in the engine room R) of a refrigeration cycle apparatus (not shown).

FIG. 2 illustrates that a bracket 27a is provided on a right side of the front wall portion of the casing 27. The bracket 27a supports the end portions of the supply side cooler pipe 21d and the discharge side cooler pipe 21e. FIG. 1 illustrates that the bracket 27a is a vertical plate that is integrated with the casing 27. The bracket 27a is tilted to some extent so that an upper side of the bracket 27a is positioned behind a lower side of the bracket 27a. The bracket 27a also faces the opening P1 of the dash panel P. The bracket 27a is larger than the opening P1 to cover the entire opening P1. FIG. 5 illustrates that a seal 60, a component of the vehicle air conditioner 1, is provided between a front surface of the bracket 27a and the dash panel P. This will be described in detail later.

A pair of insertion holes (not shown) are disposed above a vertically center portion of the bracket 27a. The supply side cooler pipe 21d and the discharge side cooler pipe 21e are inserted into the insertion holes. The peripheries of the insertion holes support and fix almost all the perimeters of the supply side cooler pipe 21d and the discharge side cooler pipe 21e disposed inside the insertion holes of the bracket 27a. The expansion valve block B protrudes from the front surface of the bracket 27a toward the front side.

FIGS. 1 and 2 illustrate that a drain part D is provided on a bottom wall portion of the casing 27. The drain part D collects and discharges condensation water condensed on and dropped from the evaporator 21. The drain part D is connected with a drain hose H that discharges the condensation water to the outside of the passenger compartment.

FIG. 3 illustrates that a defroster port 32 is formed near a longitudinally center portion of a top wall portion of the casing 27. The defroster port 32 communicates with an air mixing space R3. This defroster port 32 is connected with a defroster duct (not shown) extending to a defroster nozzle of an instrument panel.

A vent port 34 is disposed behind the defroster port 32 on the top wall portion of the casing 27. The vent port 34 communicates with the air mixing space R3. This vent port 34 is connected with a vent duct (not shown) extending to a vent nozzle of the instrument panel.

A heat port 36 is disposed on the rear side of the casing 27. The heat port 36 communicates with the air mixing space R3. This heat port 36 is connected with a foot duct (not shown) extending toward passenger's legs.

An air port 37 for a rear seat is also disposed on the rear wall portion of the casing 27. The air port 37 for a rear seat blows the conditioned air that is supplied to the rear seat of the vehicle. The air port 37 for a rear seat opens near an upper portion of the rear wall portion of the casing 27, and communicates with the air mixing space R3. The air port 37 for a rear seat is connected with a rear seat duct 50. The rear seat duct 50 accommodates a rear seat damper 57.

A downstream portion of the cooling passage R1 of the air passage R branches into and communicates with an upper side opening 29 and a lower side opening 28. The upper side opening 29 is disposed on an upper side of a partition 38 in the casing 27. The lower side opening 28 is disposed on a lower side of the partition 38 in the casing 27.

The lower side opening 28 is connected with a heating passage R2 for heating the conditioned air. This heating passage R2 also partially serves as the air passage R. The upper side opening 29 is connected with the air mixing space R3 that partially serves as the air passage R. A downstream side of the heating passage R2 is connected with the air mixing space R3.

The air mix damper 23 opens or closes the upper side opening 29 and the lower side opening 28. The air mix damper 23 also opens or closes a lower end opening 30 of the heating passage R2. When the upper side opening 29 is completely opened, the lower side opening 28 and the lower end opening 30 of the heating passage R2 are completely closed. In contrast, when the upper side opening 29 is completely closed, the lower side opening 28 and the lower end opening 30 of the heating passage R2 are completely opened.

The air mix damper 23 can adjust the degree of openings of the openings 28, 29, and 30 depending on the situation.

The defroster damper 24 opens or closes the defroster port 32. The vent damper 25 also opens or closes the vent port 34. The heat damper 26 also opens or closes the heat port 36.

The defroster damper 24, the vent damper 25, and the heat damper 26 operate together to open or close air ports 32, 34, and 36, respectively, and switch the operation mode.

The heater core 22 is provided in the heating passage R2, and heats the conditioned air flowing in the heating passage R2.

The heater core 22 includes an upper side header tank 22a, a lower side header tank 22b, and a core 22c. The core 22c includes a plurality of tubes and fins (both not shown) that extend vertically and arranged alternately. The tubes each has an upper end portion that communicates with the upper side header tank 22a. The tubes each has a lower end portion that communicates with the lower side header tank 22b.

The lower side header tank 22b is connected with a supply heater pipe 22d (illustrated in FIG. 1) that supplies engine cooling water serving as a heating medium to the lower side header tank 22b. The upper side header tank 21a is also connected with a discharge heater pipe 22e for discharging the engine cooling water in the upper side header tank 21a to the outside.

The supply heater pipe 22d and the discharge heater pipe 22e extend outside the casing 27 toward the front side, and are supported by the bracket 27a. More specifically, the supply heater pipe 22d is inserted into an insertion hole (not shown) disposed below the portions, of the bracket 27a, where the cooler pipes 21d and 21e are supported. The discharge heater pipe 22e is also inserted into another insertion hole disposed below the insertion hole. The peripheries of the insertion holes support and fix almost all the perimeters of the supply heater pipe 22d and the discharge heater pipe 22e disposed inside the insertion holes. The supply heater pipe 22d and the discharge heater pipe 22e protrude to the front of the front surface of the bracket 27a.

The seal 60 is attached on the front surface of the bracket 27a, and prevents water etc. from intruding from the opening P1 of the dash panel P to the passenger compartment S. The seal 60 has a three-layer structure. Specifically, the seal 60 includes a passenger compartment outer layer 60a, a middle layer 60b, and a passenger compartment inner layer 60c. The passenger compartment outer layer 60a is made of plate elastic material having the water shielding property. The middle layer 60b is made of a plate elastic material that is thicker than the passenger compartment outer layer 60a. The passenger compartment inner layer 60c is made of the same elastic material as that of the passenger compartment outer layer 60a. The passenger compartment outer layer 60a is bonded to the middle layer 60b. The middle layer 60b is bonded to the passenger compartment inner layer 60c. The middle layer 60b is a softer material than the passenger compartment outer layer 60a and the passenger compartment inner layer 60c.

The seal 60 has a thickness that is larger than the distance between the front surface of the bracket 27a and the dash panel P of the vehicle air conditioner 1 installed in a regular position. That is, the seal 60 is compressed by the bracket 27a and the dash panel P.

Figure 4:
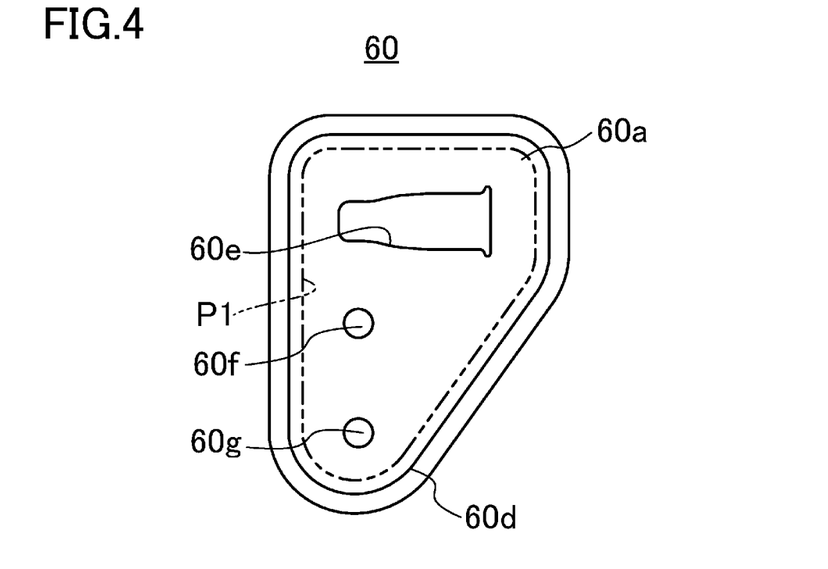
FIG. 4 is a front view of a seal.

FIG. 4 illustrates that an upper side through hole 60e is disposed above a vertically center portion of the seal 60. The expansion valve block B fits into the upper side through hole 60e. This upper side through hole 60e is laterally long along the shape of the expansion valve block B. A heat insulator is wound around an outer peripheral surface of the expansion valve block B.

An upper edge of the seal 60 extends laterally. A left edge of the seal 60 extends vertically. An upper right edge of the seal 60 extends generally parallel to the left edge. A lower right edge of the seal 60 extends diagonally to approach the left edge in a lower side. In other words, the seal 60 becomes narrower in a lower side. A lower edge of the seal 60 is also rounded downwardly.

The seal 60 also includes a middle through hole 60f that is disposed below the upper side through hole 60e. The supply heater pipe 22d is inserted into the middle through hole 60f. The seal 60 also includes a lower side through hole 60g that is disposed below the middle through hole 60f. The discharge heater pipe 22e is inserted into the middle through hole 60f. The middle through hole 60f and the lower side through hole 60g are generally circular.

FIG. 5 also illustrates that a notch 60d is provided on a surface (a front surface) of the seal 60. The surface faces the dash panel P. The notch 60d is positioned outside the periphery of the opening P1. FIG. 4 illustrates that the notch 60d is generally similar to the opening P1 (shown by the imaginary line), and continuously ring-shaped along the periphery of the opening P1. FIG. 5 also illustrates that the notch 60d has so an appropriate depth that it reaches the middle layer 60b from the passenger compartment outer layer 60a, but does not reach the passenger compartment inner layer 60c. This configuration allows the seal 60 with the notch 60d to be integrally mounted on the bracket 27a without break.

The notch 60d of the seal 60 allows a portion of the seal 60 outside the notch 60d and a portion of the seal 60 inside the notch 60d to be compressed and deformed individually.

The seal 60 is mounted on the bracket 27a that is holding the supply side cooler pipe 21d, the discharge side cooler pipe 21e, the supply heater pipe 22d, and the discharge heater pipe 22e. Then, the expansion valve block B is fitted into the upper side through hole 60e of the seal 60. Then, the supply heater pipe 22d is inserted into the middle through hole 60f. Then, the discharge heater pipe 22e is inserted into the lower side through hole 60g. Then, the passenger compartment inner layer 60c of the seal 60 is attached on the front surface of the bracket 27a.

Then, the vehicle air conditioner 1 including the seal 60 mounted as described above is installed in the passenger compartment S. When the vehicle air conditioner 1 is moved to the regular installation position in the passenger compartment S, the seal 60 is compressed along its thickness by the front surface of the bracket 27a and the dash panel P. This allows the seal 60 to be elastically deformed along the shapes of the bracket 27a and the dash panel P. In this state, an attaching portion 27b of the air conditioning unit 20 is engaged and fixed to the dash panel P etc.

FIG. 5 illustrates that the notch 60d of the seal 60 mounted on the bracket 27a is positioned outside the periphery of the opening P1. Thus, both the portion of the seal 60 outside the notch 60d and the portion of the seal 60 inside the notch 60d are pressed on a portion of the dash panel P outside the opening P1. This configuration provides a double seal structure that is based on the seals by the portion of the seal 60 inside the notch 60d and the portion of the seal 60 outside the notch 60d.

Figure 6:
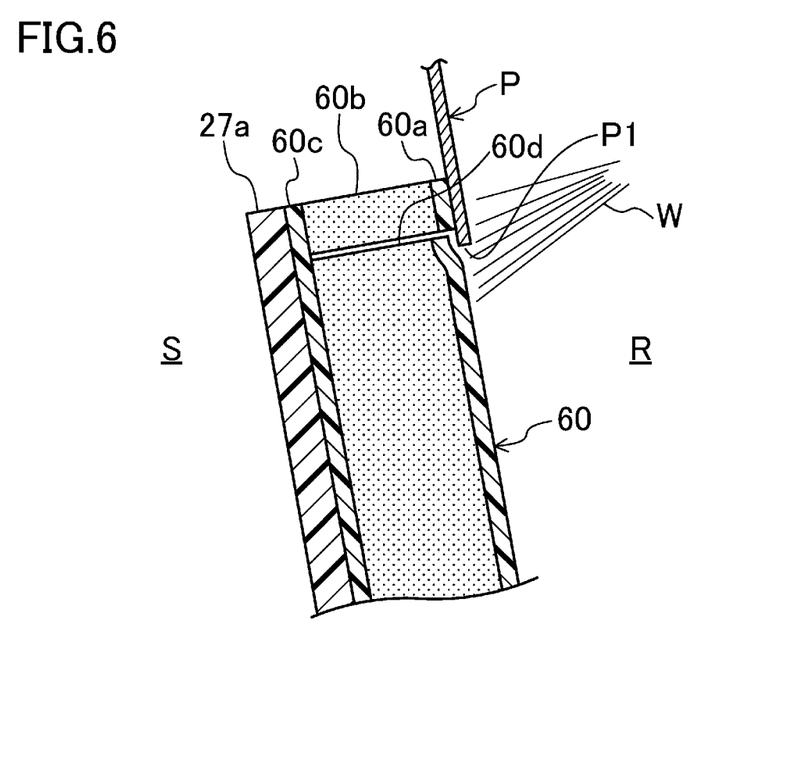
FIG. 6 illustrates that high pressure water is provided from an engine room side of FIG. 5.

FIG. 6 illustrates that high pressure water W is provided from the engine room R side to the seal 60. In this case, the portion of the seal 60 inside the notch 60d might be deformed and removed from the periphery of the opening P. However, the notch 60d of the seal 60 stops the deformation of the seal 60 by the high water pressure at the notch 60d, and avoids the deformation of the portion of the seal 60 outside the notch 60d.

This configuration keeps the portion of the seal 60 outside the notch 60d pressed on the portion of the dash panel P outside the opening P1, and provides a high sealing performance.

In this embodiment, the notch 60d is continuous along the periphery of the opening P1, and separates the portion of the seal 60 outside the notch 60d from the portion of the seal 60 inside the notch 60d. Thus, the deformation of the portion of the seal 60 inside the notch 60d by the high pressure water W does not affects the portion of the seal 60 outside the notch 60d. This configuration also provides a higher sealing performance.

As described above, the vehicle air conditioner 1 of this embodiment includes the seal 60 with the notch 60d that is positioned outside the periphery of the opening P1 of the dash panel P. This configuration provides a high sealing performance without increasing the size of the seal 60 and the pressure on the dash panel P.

The notch 60d also decreases the bounce of the seal 60 that is compressed along its thickness by the front surface of the bracket 27a and the dash panel P. This configuration decreases the pressure that a worker requires for installing the vehicle air conditioner 1 on the dash panel P, and improves the workability during the installation.

Specifically, the bounce of the compressed seal 60 with the notch 60d is lower than that of the compressed seal (not shown) without the notch 60d by 10-25%. This difference allows the worker to feel that a lower pressure is being applied on the dash panel P during the installation of the vehicle air conditioner 1 including the seal 60 with the notch 60d. The lower bounce of the seal 60 also allows a lower pressure to be applied on the bracket 27a of the vehicle air conditioner 1. Thus, the bracket 27a is able to have a simple reinforcement structure.

In this embodiment, the seal 60 includes the notch 60d that is continuous along the periphery of the opening P1. Alternatively, as shown in, e.g., alternative examples 1-3 in FIGS. 7-9, the notch 60d may be discontinuous along a periphery of an opening P1.

Figure 7:
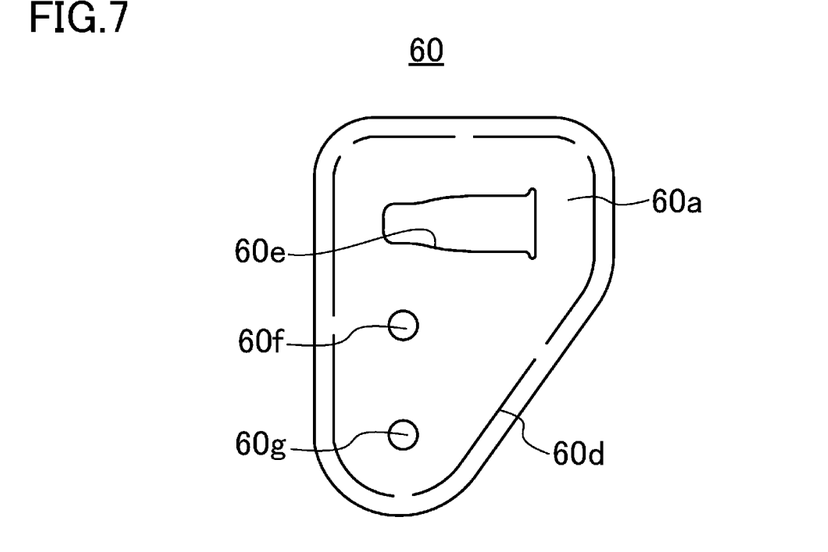
FIG. 7 illustrates an alternative example 1 of the embodiment in FIG. 4.

FIG. 7 illustrates the alternative example 1. The notch 60d of the alternative example 1 reaches the passenger compartment inner layer 60c and a back surface of the seal 60, and penetrates the seal 60. That is, in production of the seal 60 of this alternative example 1, the notch 60d can be easily stamped out with a mold. The production efficiency is also increased. In this case, the notch 60d is discontinuous. In other words, the portion of the seal 60 inside the notch 60d and the portion of the seal 60 outside the notch 60d are not separated from each other, and serve as a single component. Thus, the workability during the installation to the bracket 27a can be improved.

Figure 8:
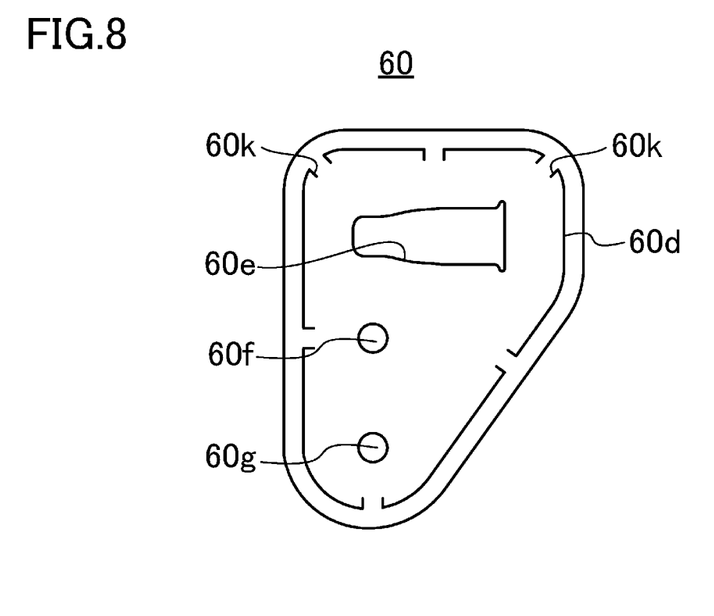
FIG. 8 illustrates an alternative example 2 of the embodiment in FIG. 4.

FIG. 8 illustrates the alternative example 2. The notch 60d of the alternative example 2 has an end portion that is continuous with a notch 60k extending toward a center of the seal 60. The notch 60k prevents an external force applied to the portion of the seal 60 inside the notch 60d from being transmitted to the portion of the seal 60 outside the notch 60d. Thus, the durability of the seal 60 can be improved.

Figure 9:
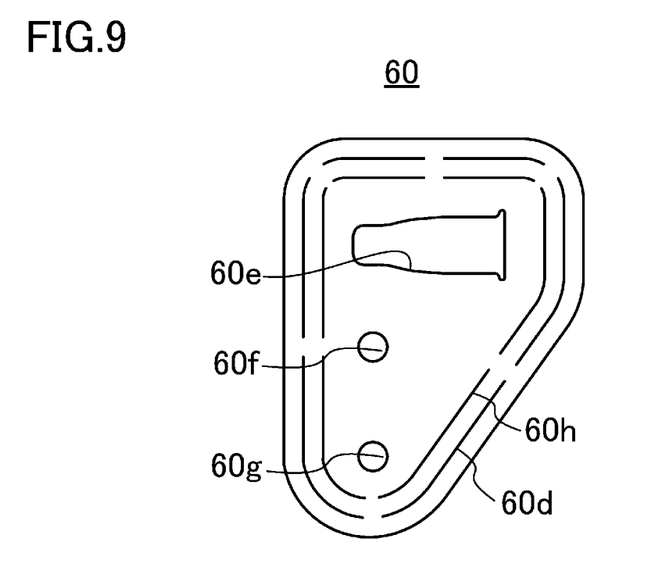
FIG. 9 illustrates an alternative example 3 of the embodiment in FIG. 4.

FIG. 9 illustrates the alternative example 3. A notch 60h is disposed inside the notch 60d of the alternative example 3. Similarly to the notch 60d, the notch 60h is positioned outside the periphery of the opening P1, and discontinuous along the periphery. In the alternative example 3, three portions are pressed on the dash panel P: the portion of the seal 60 outside the notch 60d, the portion of the seal 60 between the notch 60d and the notch 60h, and the portion of the seal 60 inside the notch 60h. The three portions can be deformed individually. This configuration provides a triple seal structure, and provides a higher sealing performance.

Alternatively, either the notch 60d or the notch 60h of the alternative example 3 may be continuous along the periphery of the opening P1.

Alternatively, both the notch 60d and the notch 60h may be continuous along the periphery of the opening P1.

INDUSTRIAL APPLICABILITY

As described above, the vehicle air conditioner of the present invention has an improved sealing performance on, e.g., the dash panel of the automobile.

DESCRIPTION OF REFERENCE CHARACTERS

1 Vehicle Air Conditioner
21 Evaporator (Heat Exchanger)

21*d*, 21*e* Cooler Pipe (Piping Component)
22 Heater Core (Heat Exchanger)
22*d*, 22*e* Heater Pipe (Piping Component)
27 Casing
27*a* Bracket
60 Seal
60*d* Notch
60*h* Notch
P Dash Panel
P1 Opening
S Passenger Compartment
R Engine Room

The invention claimed is:

1. A vehicle air conditioner to be installed in a vehicle, wherein the vehicle includes a passenger compartment, the vehicle air conditioner comprising:
   a casing accommodating a heat exchanger;
   a piping component supplying a heating medium to the heat exchanger or exhausting the heating medium from the heat exchanger; and
   a seal sealing a portion between the casing and a periphery of an opening of a partition of a vehicle, wherein
   the partition separates the passenger compartment from an area outside of the passenger compartment,
   the piping component is inserted into the opening,
   the seal has a surface facing the partition and including a notch,
   the notch is positioned outside the periphery of the opening, and
   the seal includes a passenger compartment outer layer made of plate elastic material and being in contact with the partition and a passenger compartment inner layer made of plate elastic material and being in contact with the casing.

2. The vehicle air conditioner of claim 1, wherein the notch is discontinuous along the periphery of the opening.

3. The vehicle air conditioner of claim 1, wherein the notch is continuous along the periphery of the opening.

4. The vehicle air conditioner of claim 1, wherein the passenger compartment outer layer and the passenger compartment inner layer are each made of different elastic material.

* * * * *